US012545375B2

(12) United States Patent
Boekraad et al.

(10) Patent No.: US 12,545,375 B2
(45) Date of Patent: Feb. 10, 2026

(54) CABLE LAYING VESSEL

(71) Applicant: BAGGERMAATSCHAPPIJ BOSKALIS B.V., Papendrecht (NL)

(72) Inventors: Roy Anne Boekraad, Papendrecht (NL); Louis Nieuwenhuis, Papendrecht (NL); Emiel Van Weenen, Papendrecht (NL); Maarten Alexander Beerens, Papendrecht (NL)

(73) Assignee: BAGGERMAATSCHAPPIJ BOSKALIS B.V., Papendrecht (NL)

( * ) Notice: Subject to any disclaimer, the term of this patent is extended or adjusted under 35 U.S.C. 154(b) by 61 days.

(21) Appl. No.: 18/720,362

(22) PCT Filed: Nov. 8, 2022

(86) PCT No.: PCT/NL2022/050629
§ 371 (c)(1),
(2) Date: Jun. 14, 2024

(87) PCT Pub. No.: WO2023/113592
PCT Pub. Date: Jun. 22, 2023

(65) Prior Publication Data
US 2025/0058855 A1 Feb. 20, 2025

(30) Foreign Application Priority Data

Dec. 15, 2021 (NL) ...................... 2030145

(51) Int. Cl.
*B63B 35/04* (2006.01)
*F16L 1/235* (2006.01)
(52) U.S. Cl.
CPC .............. *B63B 35/04* (2013.01); *F16L 1/235* (2013.01)

(58) Field of Classification Search
CPC .. B63B 35/04; F16L 1/16; F16L 1/225; F16L 1/235
See application file for complete search history.

(56) References Cited

U.S. PATENT DOCUMENTS 3,431,739 A * 3/1969 Richardson ......... E21B 43/0107
29/237
5,080,530 A * 1/1992 Crawford ................ B63B 35/04
114/77 R (Continued)

FOREIGN PATENT DOCUMENTS

WO 2020180178 A1 9/2020

OTHER PUBLICATIONS

International Search Report from corresponding PCT Application No. PCT/NL2022/050629, Jan. 3, 2023.

(Continued)

*Primary Examiner* — Benjamin F Fiorello
(74) *Attorney, Agent, or Firm* — Workman Nydegger

(57) ABSTRACT

A cable laying vessel and method are provided for laying an underwater cable, the cable laying vessel including a floating hull with a bow, a stern and a deck. The hull has a forward shipping direction. The cable laying vessel further includes a cable handling installation that includes a cable chute at the stern, and a cable quadrant and a quadrant manipulator for the cable quadrant on the deck. The cable chute includes a convex curved bottom wall with a bottom wall apex where the bottom wall faces furthest away from the stern. The bottom wall continues as from the bottom wall apex downwards back towards the stern. The cable chute includes a left outer guide wall and a right outer guide wall that extend under an angle with the bottom wall and that flare away from each other in a downward direction.

19 Claims, 13 Drawing Sheets

(56) References Cited

U.S. PATENT DOCUMENTS

| | | | | |
|---|---|---|---|---|
| 5,580,187 | A * | 12/1996 | Jordan | F16L 1/225 |
| | | | | 405/173 |
| 5,586,750 | A * | 12/1996 | Ezoe | B63B 35/04 |
| | | | | 254/134.3 SC |
| 9,694,879 | B2 * | 7/2017 | Maidla | B63B 35/03 |
| 2009/0324338 | A1 * | 12/2009 | Thompson | G01V 1/3852 |
| | | | | 405/158 |
| 2013/0101355 | A1 | 4/2013 | Thompson et al. | |
| 2014/0334880 | A1 * | 11/2014 | Roodenburg | B63B 35/03 |
| | | | | 405/166 |
| 2015/0104258 | A1 * | 4/2015 | Varfolomeev | F16L 1/203 |
| | | | | 405/166 |
| 2017/0356161 | A1 * | 12/2017 | Rooney | F16L 55/11 |

OTHER PUBLICATIONS

Dutch Search Report from corresponding NL Application No. 2030145, Aug. 18, 2022.

* cited by examiner

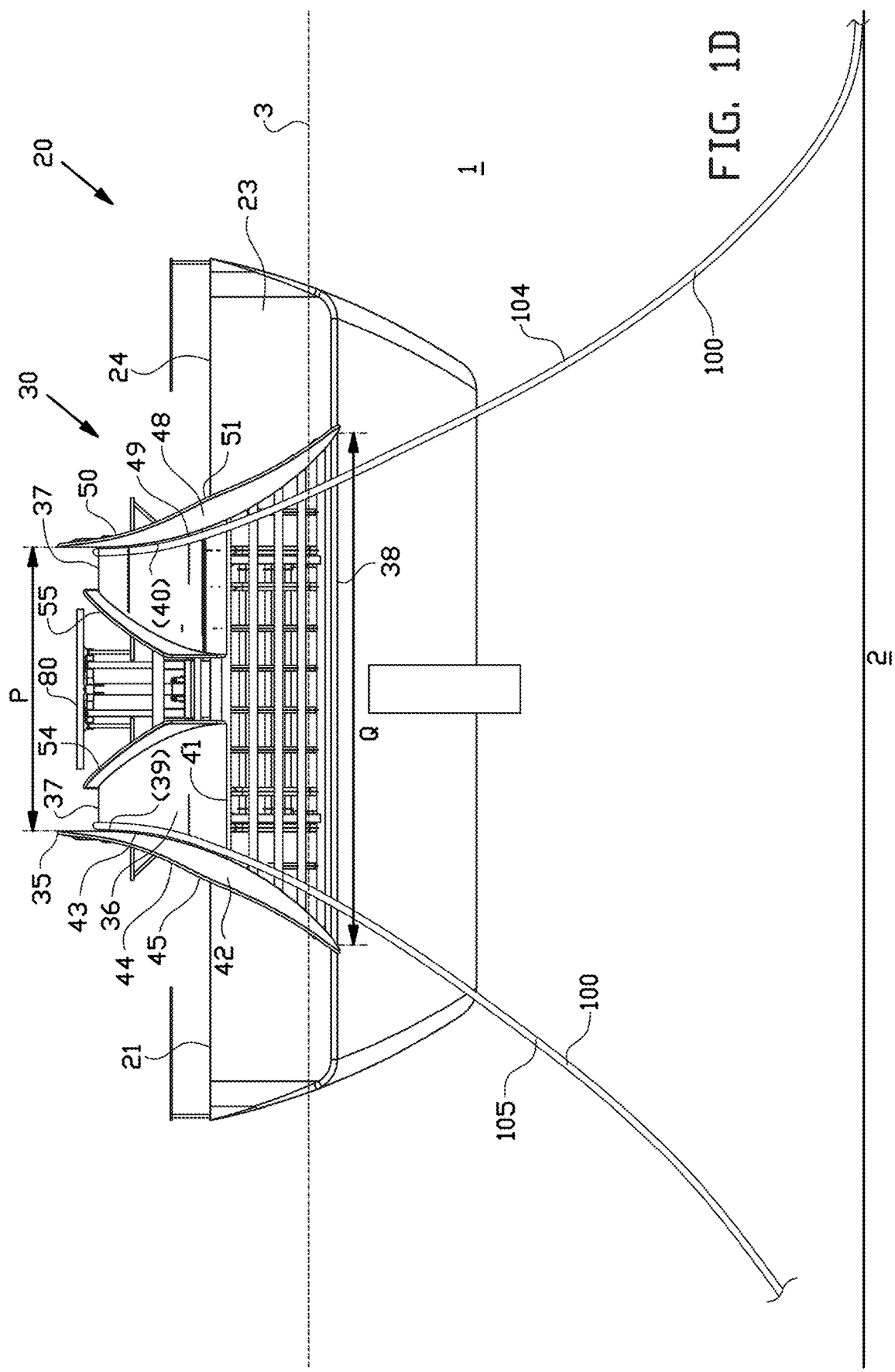

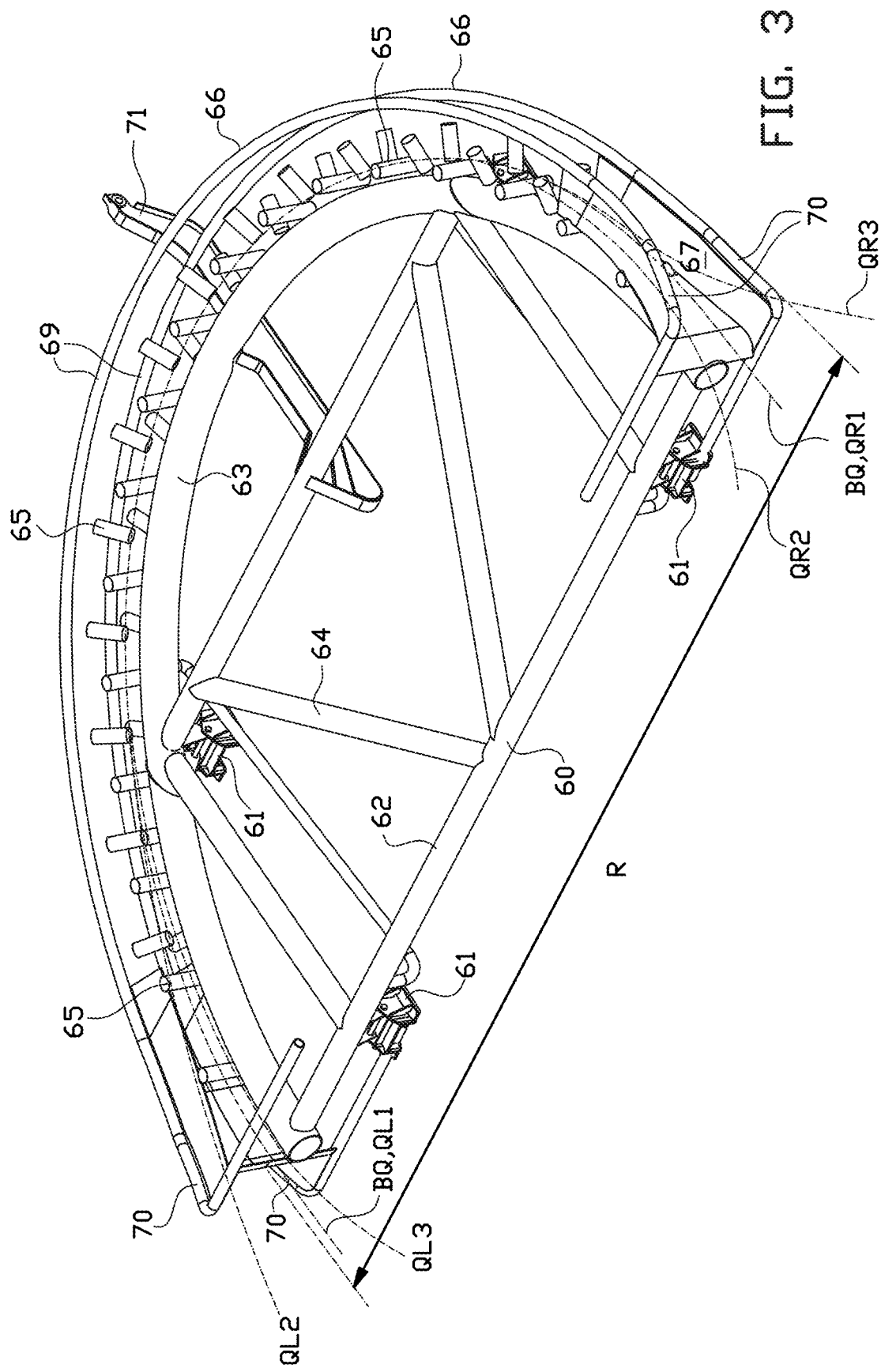

CABLE LAYING VESSEL

BACKGROUND

The invention relates to a cable laying vessel and a method for laying an underwater cable on a water body bottom.

SUMMARY OF THE INVENTION

A cable laying vessel comprises a hull with a deck and an elongate cable slide for the underwater cable that extends over the stern of the hull and that is downwardly curved towards the water surface. Examples are the cable laying vessel "Tyco Responder", the cable laying vessel "Da Vinci" and the cable laying vessel "NKT Victoria" that are used for laying long haul underwater fiber optic telecom cables that may contain active electronic equipment like repeaters and amplifiers, or long haul export power cables between an offshore windfarm and the shore. The known cable laying vessels have a large storage carrousel where the long underwater cable is reeled in the storage area and that is fed over the cable slide. During the cable laying operation, the cable laying vessel ships along a long prescribed cable route with high precision whereby the released underwater cable settles on the water body bottom according to the prescribed cable route. As the cable laying vessel ships forward during the cable laying operation, the released underwater cable automatically remains aligned with the elongate cable slide while it pends behind and spaced apart from the hull. At the end of the prescribed cable route, the end of the underwater cable is overboarded via the elongate cable slide to be picked up later on, for example to bring it on shore.

An underwater cable has a prescribed minimal bending radius (MBR) above which the structural integrity is ensured by the cable manufacturer. When the bending below the prescribed bending radius, the radius comes proper functioning of the underwater cable may no longer be ensured, or the underwater cable may even become damaged. The damage is for example fracture of the internal electric conductors, or initialization of leakages from outside.

During the cable laying operation the bending radius of the underwater cable is continuously monitored to ensure that it remains above the minimal bending radius as prescribed by the cable manufacturer. As the cable laying vessel releases the underwater cable while it ships forward, the curvature of the elongate cable slide ensures that the curvature of the underwater cable remains above the prescribed minimal bending radius.

Offshore windfarms comprise multiple offshore installations, such as offshore wind turbines that are connected for example with transformer platforms by means of inter-array underwater electric power cables. These inter-array underwater cables are much shorter than abovementioned long haul underwater fiber optic telecom cables or export power cables, and both ends are offshore connected with an offshore installation. Abovementioned long haul cable vessels laying are unsuitable for laying performing such inter-array offshore cable operations, as the cable may slip from the elongate cable slide or buckle behind the elongate cable slide when the vessel maneuvers in the vicinity of the offshore installations.

For inter-array offshore cable laying operations, an alternative type cable laying vessel is used that comprises a cable quadrant for handling a cable overlength. The cable quadrant has an arc shaped cable gutter with a radius that is larger than the prescribed minimal bending radius. At a first stage of the inter-array cable laying operation, the first end of the underwater cable is paid out and connected with one offshore installation. Subsequently, the cable laying vessel ships along the relatively short prescribed cable route towards another offshore installation with high precision whereby the released underwater cable settles on the sea floor according to the prescribed cable route. At a final stage of the cable laying operation, the second end is formed by cutting off a cable overlength of the underwater cable on the deck that is fed along the cable quadrant. The second end is pulled towards the offshore installation and the cable quadrant is overboarded to guide and support the cable overlength during its descend to the water body bottom.

The cable laying operation can only be initiated when it is safe to maneuver the cable laying vessel on the cable overboarding location in a cable overboarding position in which the hull extends transverse to the prescribed cable route. In practice cable laying operation can therefore only be initiated when the local wave height is below a prescribed first safety height when the wave direction is parallel to the forward shipping direction of the hull, or below a prescribed lower second safety height when the wave direction deviates from the forward shipping direction of the hull. Otherwise the waves induce rolling motions to the cable laying vessel whereby there is a risk that the bending radius goes under the prescribed minimal bending radius. Therefore the sea state during the overboarding of the cable overlength is the limiting factor for the entire inter-array cable laying operation.

It is an object of the present invention to provide a cable laying vessel having an improved workability with respect to the final stage of an inter-array cable laying operation in which a cable overlength of the underwater cable is overboarded.

According to a first aspect, the invention provides a cable laying vessel for laying an underwater cable, wherein the underwater cable has a prescribed minimal bending radius above which the structural integrity of the underwater cable is ensured, and wherein the cable laying vessel comprises a floating hull with a bow, a stern and a deck, and wherein the hull has a forward shipping direction, wherein the cable laying vessel comprises a cable handling installation that comprises a cable chute at the stern, and a cable quadrant and a quadrant manipulator for the cable quadrant on the deck, wherein the cable chute comprises a convex curved bottom wall with a bottom wall apex where the bottom wall faces furthest away from the stern, wherein the bottom wall continues as from the bottom wall apex downwards back towards the stern, and wherein the cable chute comprises a left outer guide wall and a right outer guide wall that extend under an angle with the bottom wall and that flare away from each other in a downward direction, wherein a cable overlength of the underwater cable is fed along the cable quadrant and forms a first cable leg and a second cable leg that both extend as from the cable quadrant through the cable chute, wherein the left outer guide wall, the bottom wall and the right outer guide wall define multiple cable trajectories for the abutting first cable leg and the abutting second cable leg, wherein the cable trajectories are fluently curved and have over the entire length a radius or a series of sections with radii that are larger than the prescribed minimal bending radius of the underwater cable.

The cable laying vessel according to the invention comprises a cable chute that defines cable trajectories that flare away from each other in the direction away from the deck and that are still safe with respect to the prescribed minimal bending radius of the underwater cable, especially during the overboarding of the cable overlength by means of the cable quadrant. The cable chute keeps the underwater cable spaced apart from the hull, even when the shipping direction of the hull and thereby the cable chute is under an overboarding angle with the normal to the tangent of the prescribed cable route at the overboarding location. Therefore it is possible to maneuver the hull with its forward shipping direction to some extend straight into incoming waves to find an optimum between low induced rolling motions and an acceptable overboarding angle. In a vertical projection the underwater cable may extend under the hull. This makes the final stage in which the underwater cable is overboarded less critical, which improves the workability of the cable laying vessel for the entire cable laying operation.

In an embodiment the bottom wall has a distal bottom end that extends in downward direction below the stern to keep the underwater cable spaced apart from the hull over the entire length from the deck to under water.

Alternatively formulated the bottom wall has a distal bottom end, wherein the tangent of the bottom wall at the distal bottom end extends in downward direction outside the stern.

In an embodiment the left outer guide wall and the right outer guide wall extend in a downward direction beyond the bottom wall apex along the bottom wall to define and bound the cable trajectories over the entire length of the bottom wall.

In an embodiment the bottom wall, the left outer guide wall and the right outer guide wall of the cable chute define an entrance opening of the cable chute having an entrance opening width, and an exit opening of the cable chute having an exit opening width, wherein the cable trajectories extend between the entrance opening and the exit opening, wherein the exit opening width is at least 1.5 times the entrance opening width.

In an embodiment the bottom wall, the left outer guide wall and the right outer guide wall of the cable chute define an entrance opening of the cable chute having an entrance opening width, and an exit opening of the cable chute having an exit opening width, wherein the cable trajectories extend between the entrance opening and the exit opening, wherein the entrance opening width is larger than the width of the cable quadrant whereby the cable quadrant can be overboarded by sliding it through the cable chute.

In an embodiment the bottom wall, the left outer guide wall and/or the right outer guide wall are formed with a plate, with consecutive plate sections, with parallel tubes or combinations thereof.

In an embodiment the cable quadrant comprises a cable guiding track that extends over half a circle, wherein the cable guiding track has a central section and two end sections at the ends of the central section that flare away as from the central section, wherein the cable guiding track defines multiple cable trajectories that are fluently curved and that have over the entire length a radius or a series of sections with radii that are all larger than the prescribed minimal bending radius of the underwater cable, wherein the cable trajectories extend along the central section of the cable guiding track in a notional straight middle plane and may bend out of that notional straight middle plane along the end sections. The cable quadrant keeps the cable overlength in the notional straight plane, while it allows the underwater cable to bend out from it at the ends for a fluent transfer of the cable overlength towards the cable chute.

In an embodiment thereof the end sections of the cable guiding track flare symmetrically with respect to the notional straight plane, and the cable trajectories may bend out to both sides of the notional straight middle plane, whereby the cable overlength may be guided by the cable chute when the cable quadrant passes through the cable chute, and may also be released from the cable chute at one leg thereof, while the other leg of the cable overlength is still guided by the cable chute. This makes it possible to tilt the cable quadrant with respect to the cable chute for example while the bending radius remains above the minimal bending radius.

In an embodiment the quadrant manipulator comprises a base frame, a support frame, a tilting mechanism between the base frame and the support frame, and a cable quadrant support that is configured to receive and support the cable quadrant, wherein the support frame is tiltable between a retracted position to receive the cable quadrant, and an extended position in which the cable quadrant extends in an upright position with respect to the cable chute.

In an embodiment thereof the quadrant manipulator comprises a cable quadrant support drive between the support frame and the cable quadrant support, wherein the cable quadrant support drive is configured to move the cable quadrant support with respect to the support frame between a retracted position to receive the cable quadrant, and multiple extended positions in which the cable quadrant support extends further away from the support frame and under a supporting angle with respect to the retracted position. The supporting angle can be brought in conformity with the overboarding angle of the hull with respect to the prescribed cable route, whereby at least in in a vertical projection the underwater cable is practically free from bends. Any bends occur only in a vertical plane.

In an embodiment thereof the quadrant manipulator comprises a crane for hoisting the cable quadrant in the upright position.

In an embodiment thereof the crane comprises a crane boom that is pivotably connected with the base frame, wherein the crane boom is pivotable between a retracted position to receive the cable quadrant, and an upright position in which the cable quadrant hangs on the crane boom.

In an embodiment thereof the crane comprises a hoisting cable that extends between the crane boom and the cable quadrant. The hoisting cable of the crane can be used to lower the cable quadrant to the water body bottom while it supports the cable overlength.

According to a second aspect, the invention provides a method for laying an underwater cable according to a prescribed cable route on a water body bottom between two offshore installations by means of a cable laying wherein the underwater cable has a prescribed vessel, minimal bending radius above which the structural integrity of the underwater cable is ensured, and wherein the cable laying vessel comprises a floating hull with a bow, a stern and a deck, and wherein the hull has a forward shipping direction, wherein the cable laying vessel comprises a cable handling installation that comprises a cable chute at the stern, and a cable quadrant and a quadrant manipulator for the cable quadrant on the deck, wherein the cable chute comprises a convex curved bottom wall with a bottom wall apex where the bottom wall faces furthest away from the stern, wherein the bottom wall continues as from the bottom wall apex downwards back towards the stern, and wherein the cable chute comprises a left outer guide wall and a right outer guide wall that extend under an angle with the bottom wall and that from each other in a downward direction, wherein a cable overlength of the underwater cable is fed along the cable quadrant and forms a first cable leg and a second cable leg that both extend as from the cable quadrant through the cable chute, wherein the left outer guide wall, the bottom wall and the right outer guide wall define multiple cable trajectories for the abutting first cable leg and the abutting second cable leg, wherein the cable trajectories are fluently curved and have over the entire length a radius or tangent that are larger than minimal bending of the prescribed radius the underwater cable, wherein the method comprises at the first offshore installation releasing the first end of the underwater cable from the deck via the cable chute and bringing the first end to the first offshore installation, maneuvering the cable laying vessel along the prescribed cable route while releasing the underwater cable from the deck via the cable chute whereby the underwater cable settles on the water body bottom on the prescribed cable route, maneuvering the cable laying vessel to a cable overboarding location between the first offshore installation and the second offshore installation, forming on the deck the cable overlength in the underwater cable between the first end and a second end of the offshore cable, wherein the cable overlength is fed along the cable quadrant and the first leg and the second leg are fed through the cable chute, wherein the cable quadrant is moved towards the cable chute for overboarding the cable overlength, wherein the cable laying vessel is maneuvered with the hull under an overboarding angle with the normal to the tangent of the prescribed cable route at the cable overboarding location, wherein the overboarding angle is larger than 10 degrees, preferably larger than 20 degrees, wherein the first leg or the second leg extends behind the cable chute in a vertical projection under the hull.

In an embodiment the quadrant manipulator frame, a tilting comprises a base frame, a support mechanism between the base frame and the support frame, and a cable quadrant support that is configured to receive and support the cable quadrant, wherein the support frame is tiltable between a retracted position to receive the cable quadrant, and an extended position in which the cable quadrant extends in an upright position with respect to the cable chute, wherein the method comprises receiving the cable quadrant by the cable quadrant support with the support frame in the retracted position, and tilting the support frame into the extended position to bring the cable quadrant from a lying position wherein the cable quadrant extends parallel to the deck, into the upright position with respect to the cable chute.

In an embodiment thereof the quadrant manipulator comprises a cable quadrant support drive between the support frame and the cable quadrant support, wherein the cable quadrant support drive is configured to move the cable quadrant support with respect to the support frame between a retracted position to receive the cable quadrant, and multiple extended positions in which the cable quadrant support extends further away from the support frame and under an angle with respect to the retracted position, wherein the method comprises bringing the cable quadrant under a supporting angle by means of the cable quadrant support, wherein the supporting angle is equal to the overboarding angle.

In an embodiment quadrant the manipulator comprises a crane for hoisting the cable quadrant in the upright position, wherein the method comprises hoisting the cable quadrant in its upright position by means of the crane, and lowering the cable overlength of the underwater cable as from the cable chute towards the prescribed cable route by means of the hoisted cable quadrant.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which:

FIGS. 1A-1D are an isometric view, a top view, a side view and a rear view of the stern side of a cable laying vessel during a cable laying operation in a water body;

FIG. 3 is an isometric view of a cable quadrant of the cable laying vessel of FIGS. 1A-1E that is used for handling a cable overlength of the underwater cable;

DETAILED DESCRIPTION OF THE INVENTION

Figure 1A:
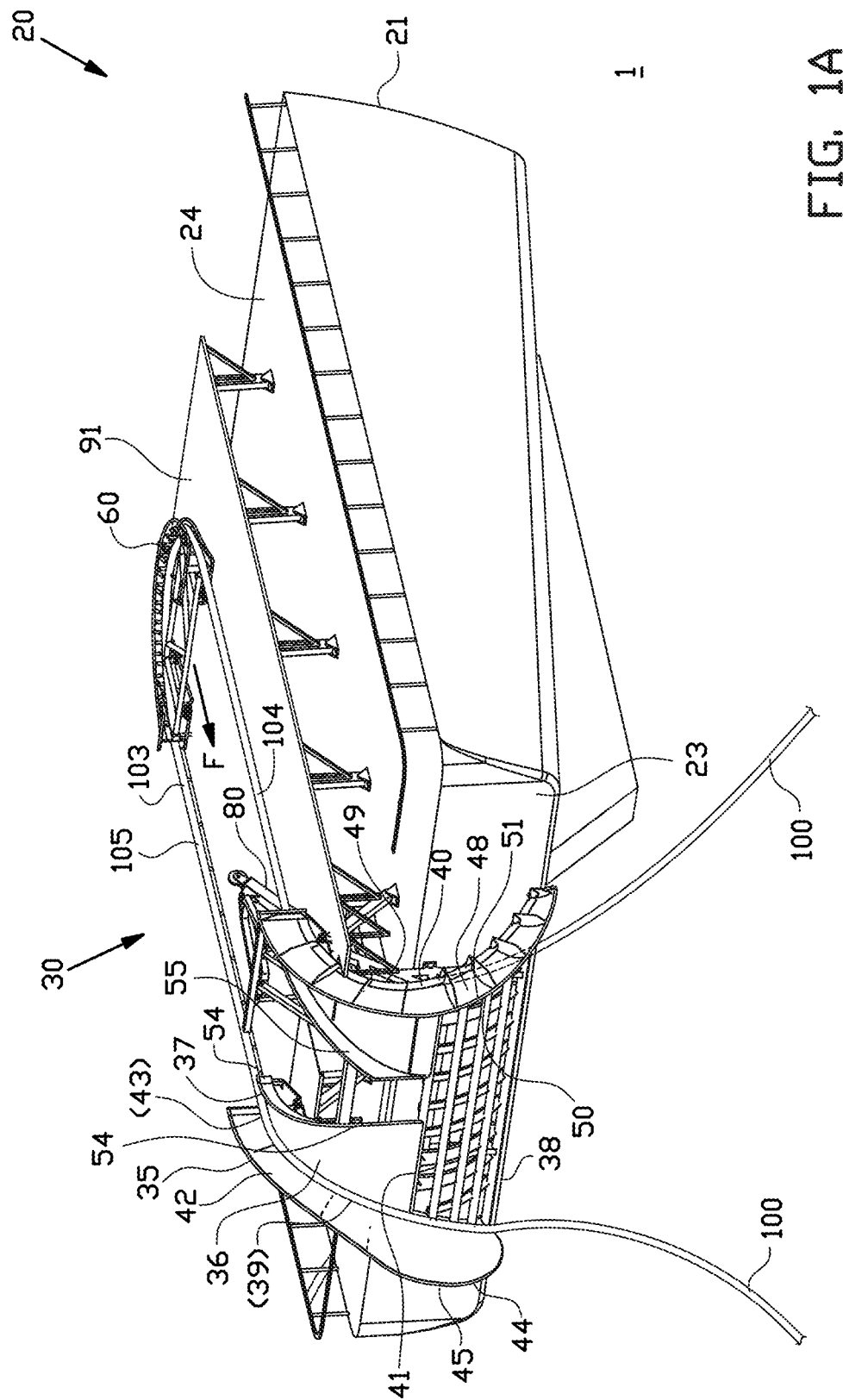
Figure 1B:
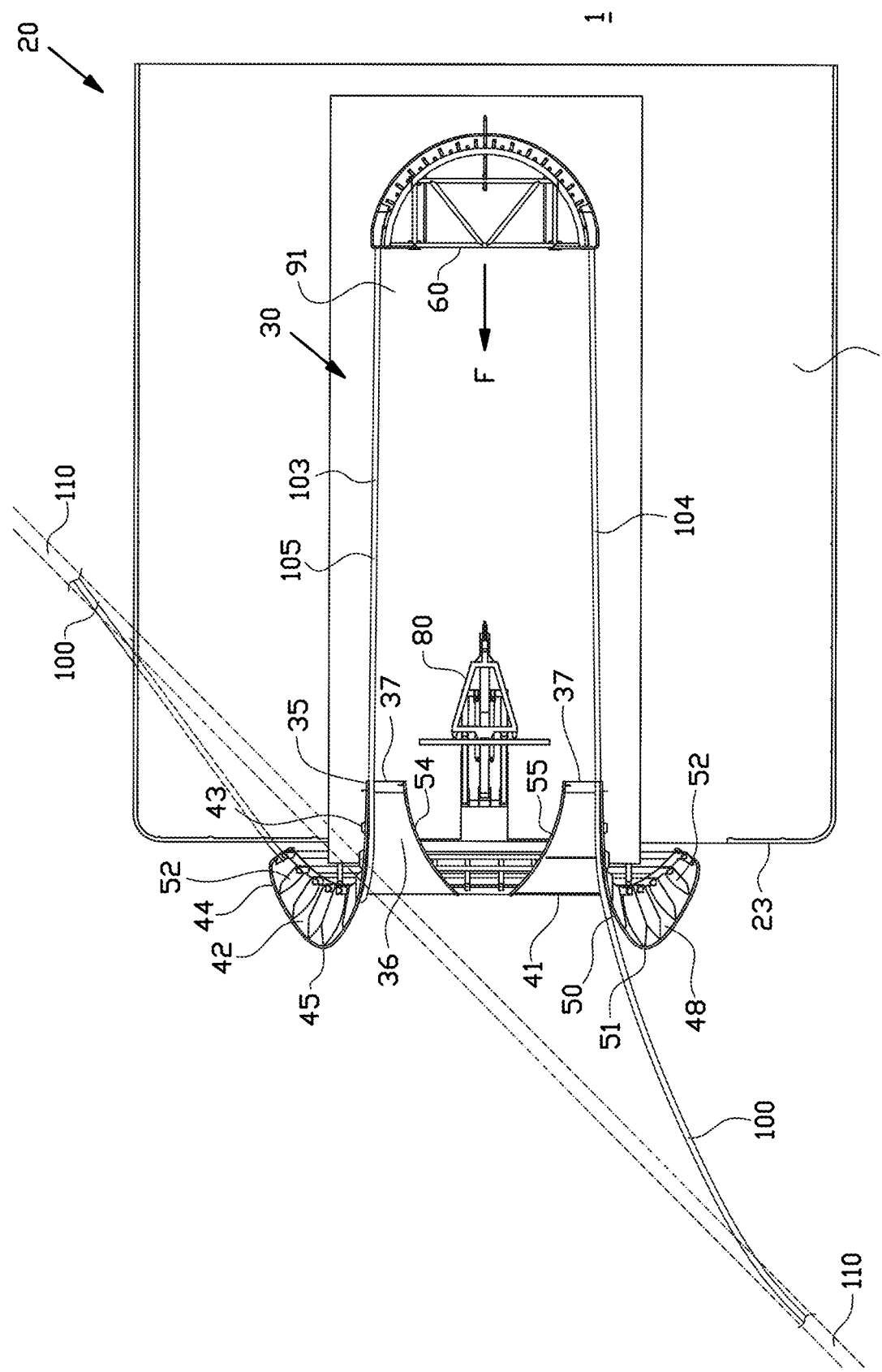
Figure 1C:
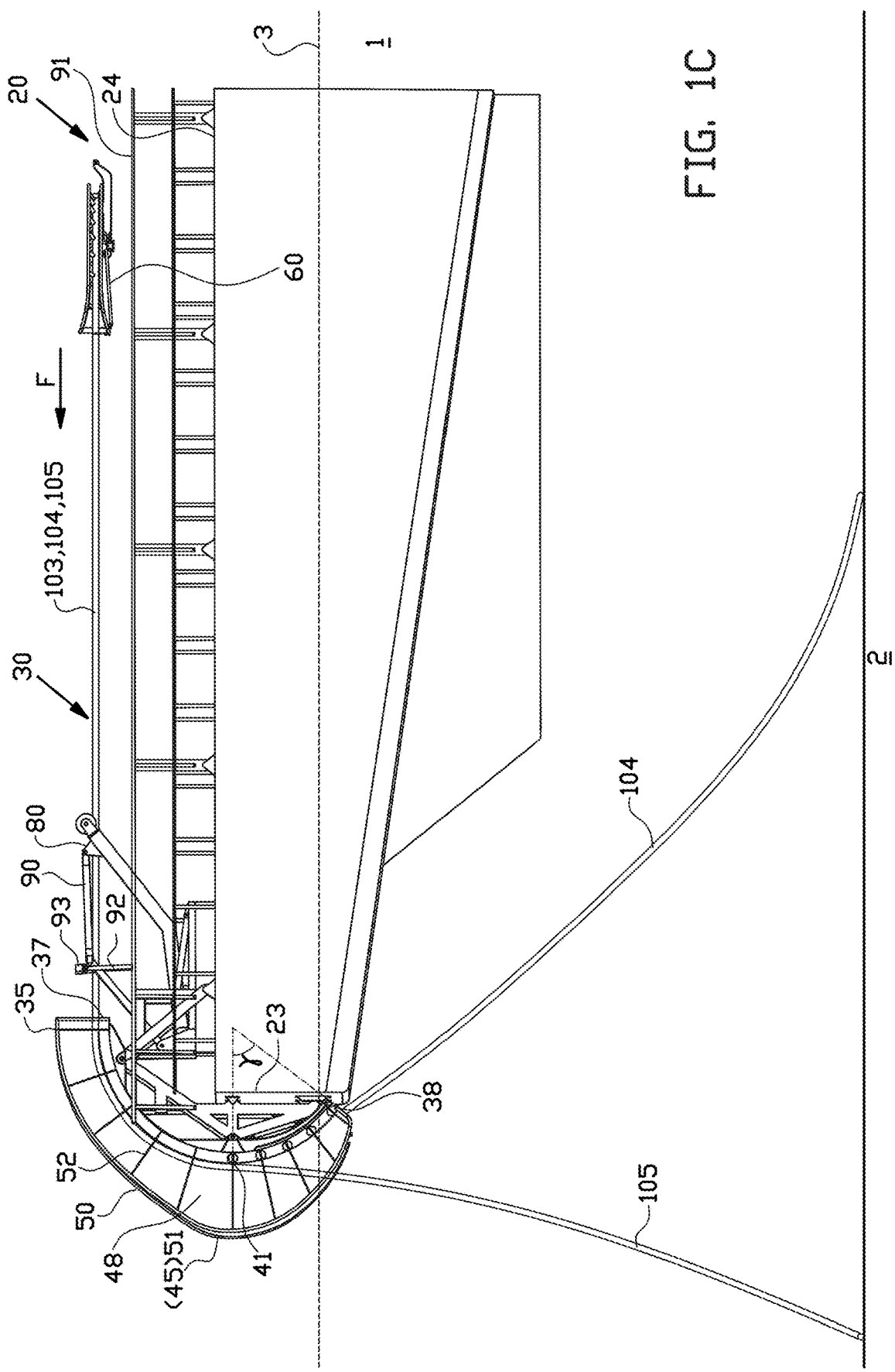
Figure 1E:
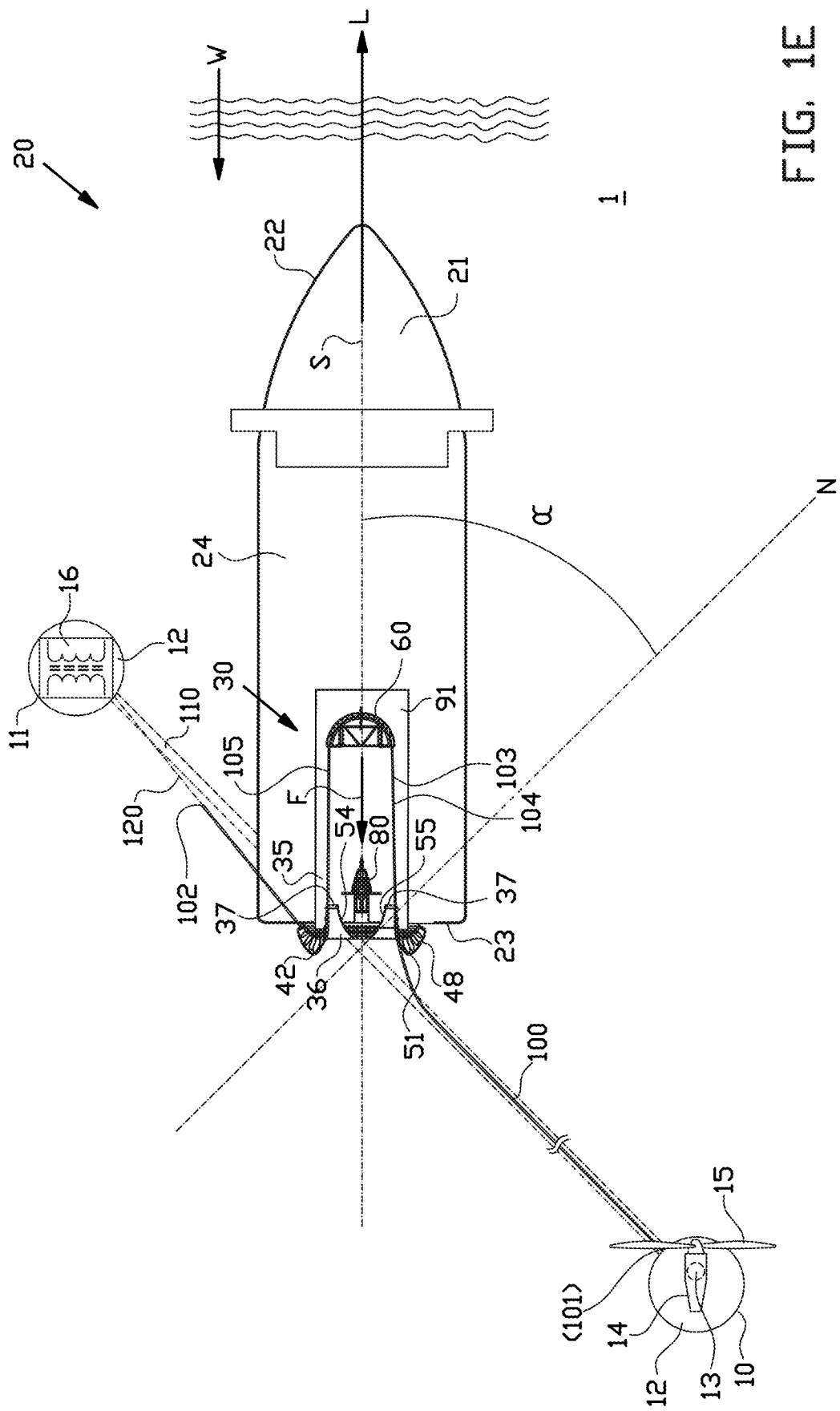
FIG. 1E is a schematic top view of the entire cable laying vessel of FIGS. 1A-1D during the cable laying operation between two offshore wind turbines in the water body.

FIGS. 1A-1D show a cable laying vessel 20 on a water body 1 with a water body bottom 2, such as a sea with a sea bed, or a lake, at a location with multiple offshore installations, in this illustrative example an offshore wind turbine 10 and an offshore substation 11 as shown in FIG. 1E. The offshore installations form part of an offshore infrastructure, in this example a wind farm for generating electricity. As shown in FIG. 1E, the offshore wind turbine 10 and the offshore substation 11 both comprise a foundation 12 that is installed on the water body bottom 2 and that extends with its top side above the water surface 3. The offshore wind turbine 10 comprises a tower 13 on the foundation 12, and a nacelle 14 with an internal electric generator that is driven by a rotor 15. The offshore substation 11 comprises a transformer 16 on the foundation 12. The offshore substation 11 is connected with further onshore infrastructure by means of a not-shown long haul export power cable with.

The cable laying vessel 20 is configured for laying an inter-array underwater cable 100 between offshore wind turbine 10 and the offshore substation 11, in this example an underwater cable for electric power transmission. At the end of the inter-array cable laying operation the underwater cable 100 extends in this example between the offshore wind turbine 10 and the offshore substation 11 according to a prescribed cable route 110 as defined for example by means of a Route Position List (RPL), and the ends of the underwater cable 100 is electrically connected thereto to form part of a power distribution grid between the offshore installations of the offshore wind farm. In practice the prescribed cable route 110 for the inter-array underwater cable 100 is a straight route.

The underwater cable 100 has a prescribed minimal bending radius (MBR) above which the structural integrity is ensured by the cable manufacturer. When the bending radius comes below the MBR, the proper functioning of the underwater cable 100 may no longer be ensured, or the underwater cable 100 may even become damaged. The damage is for example fracture of the internal electric conductors, or initialization of leakages from outside.

As best shown in FIG. 1E, the cable laying vessel 20 comprises a floating hull 21 with a bow 22, a stern 23 and a horizontal deck 24. The hull 21 has an elongate direction or forward shipping direction L that extends parallel to a vertical symmetry plane S of the hull 21. In FIGS. 1A-1D only the stern side of the cable laying vessel 20 is shown.

As best shown in FIGS. 1A-1E, the cable laying vessel 20 comprises a cable handling installation 30 on the hull 21. The cable handling installation 30 comprises a cable chute 35, a cable quadrant 60, a cable quadrant guide 91 and a quadrant manipulator 80.

The cable chute 35 is made of steel and extends in vertical direction along and beyond the entire stern 23 and comprises a convex bottom wall 36 having a curvature with a constant radius, or with a series of sections having radii all above the prescribed minimal bending radius. The bottom wall 36 has a top edge 37 on the deck 24 and a longer bottom edge 38 at the bottom of the stern 23 that both extend parallel to the deck 24, and a left side edge 39 and a right side edge 40 that fluently flare outwards from the opposite ends of the top edge 37 to the opposite ends of the bottom edge 38 in a symmetrical manner with respect to the vertical symmetry plane S of the hull 21. The bottom wall 36 has a bottom wall apex 41 that defines in horizontal direction the outermost distal location of the curved bottom wall 36 with respect to the stern 23. As shown in FIG. 1C, the convex bottom wall 36 extends as from the bottom wall apex 41 further downwards to the bottom edge 38 with a substantially constant radius over an angle γ of more than 10 degrees, preferably more than 20 degrees, more preferred more than 30 degrees. The tangent of the bottom wall 36 at the bottom edge 38 extends in downward direction outside and spaced apart from the stern 23.

The cable chute 35 comprises a left outer guide wall 42 having a bottom edge 43 that follows the curvature of the left side edge 39, and a top edge 44 having a left guide wall apex 45 that defines the outermost distal location of the top edge 44 with respect to the stern 23. The cable chute 35 comprises a right outer guide wall 48 having a bottom edge 49 that follows the curvature of the right side edge 40, and a top edge 50 having a right guide wall apex 51 that defines the outermost distal location of the top edge 50 with respect to the stern 23. The left outer guide wall 42 and the right outer guide wall 48 are symmetrical with respect to the vertical symmetry plane S of the hull 21 and define an entrance opening width P at the top edge 37 of the bottom wall 36, and an at least 1.5 times larger exit opening width Q at the bottom edge 38. The left outer guide wall 42 and the right outer guide wall 48 extend at their bottom edges 43, 49 under a fixed angle of 90-120 degrees with respect to the adjacent bottom wall 36. As from the bottom wall 36, the left outer guide wall 42 and the right outer guide wall 48 fluently flare away from each other. The fixed angle between the left outer guide wall 42 and the right outer guide wall 48 with respect to the bottom wall 36 is ensured by means of multiple external reinforcement plates 52. The bottom wall 36, the left outer guide wall 42 and the right outer guide wall 48 are formed with a plate, or with welded plate sections, or with multiple parallel tubes, or series and combinations thereof.

Figure 2A:
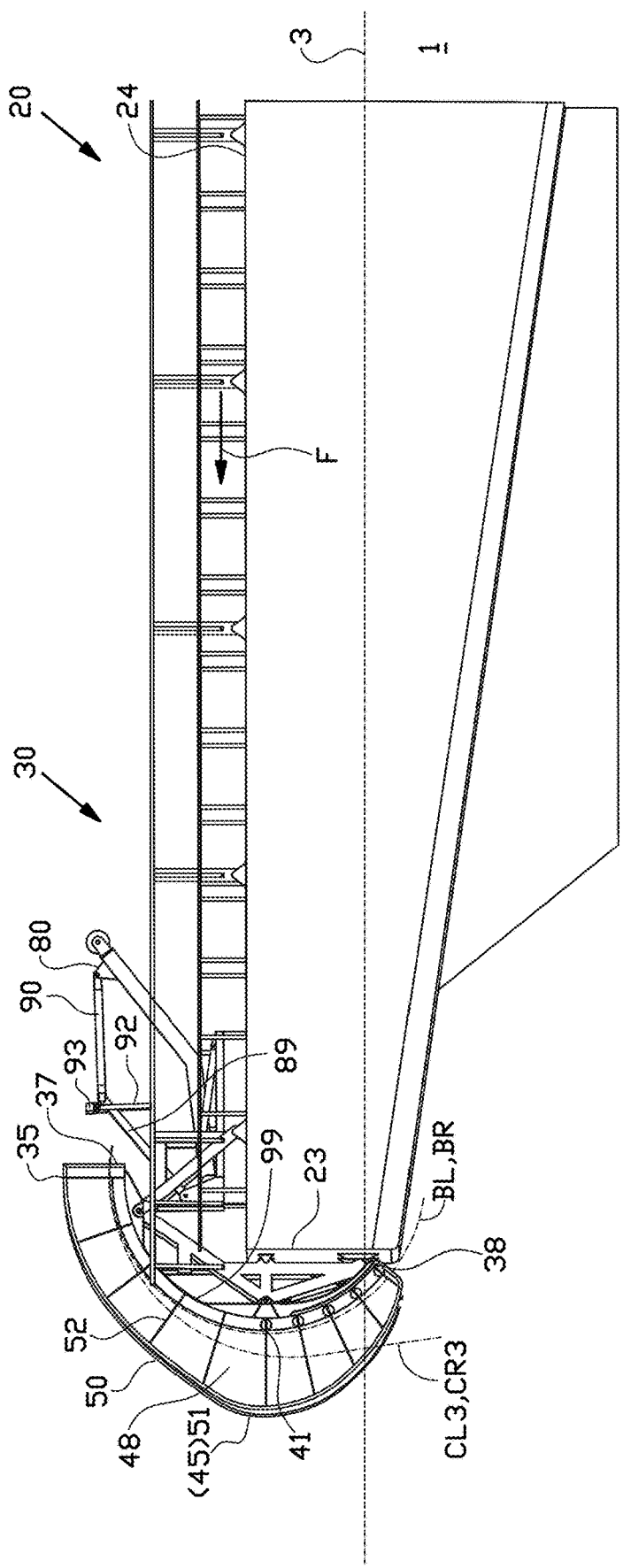
FIGS. 2A and 2B are a side view and a rear view of the stern side of the cable laying vessel of FIGS. 1A-1D without the underwater cable.
Figure 2B:
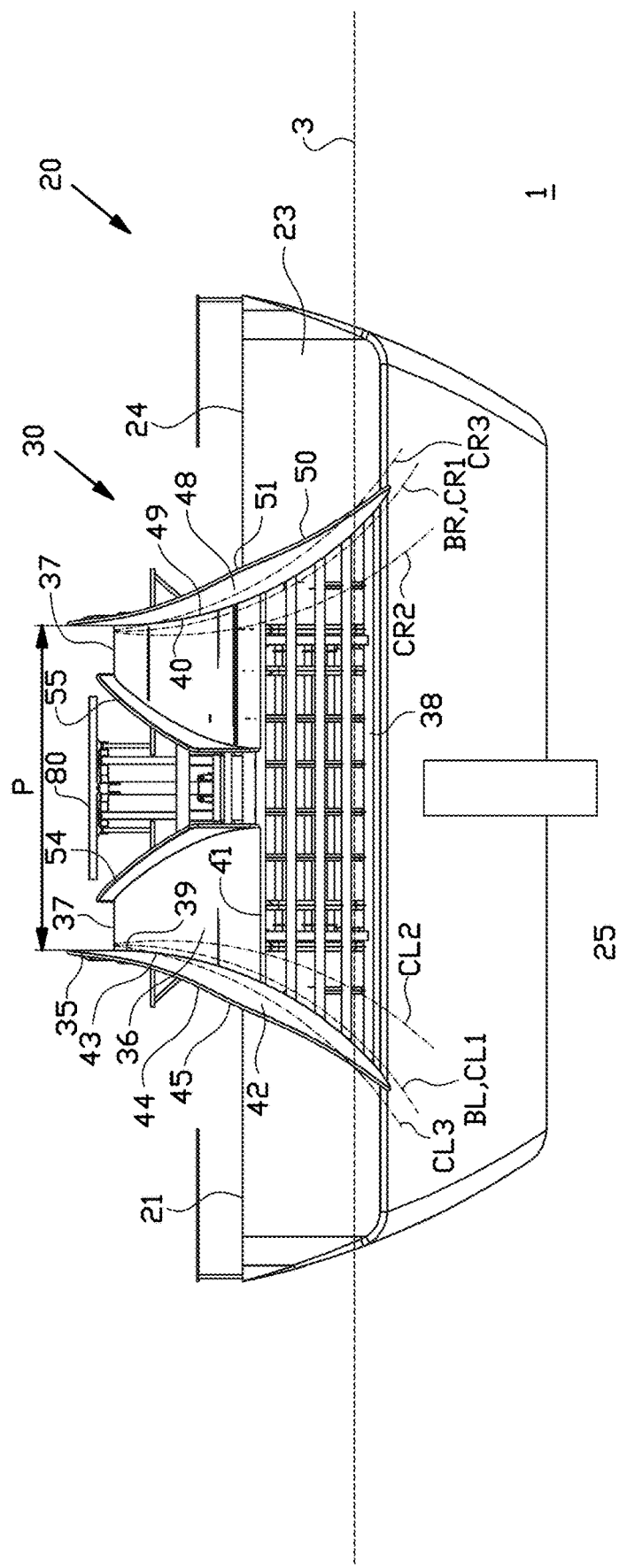

As best shown in FIGS. 2A and 2B without the underwater cable 100, the left outer guide wall 42 and the bottom wall 36 together define a left cable boundary BL of the cable chute 35 that is fluently curved and flares outwards as from the deck 24 until below the stern 23. In the same manner, the right outer guide wall 48 and the bottom wall 36 together define a right cable boundary BR of the cable chute 35 that is fluently curved and flares outwards as from the deck 24 until below the stern 23. The left cable boundary BL and the right cable boundary BR both have a radius or series of sections having radii that are all larger than the prescribed minimal bending radius of the underwater cable 100. The tangents of the left cable boundary BL and the right cable boundary BR at the bottom edge 38 of the cable chute 35 downwardly extends outside and spaced apart from the hull 21.

In the vicinity of the left cable boundary BL multiple left cable trajectories are defined over the left outer guide wall 42 and the bottom wall 36, for example a first left cable trajectory CL1, a second left cable trajectory CL2 and a third left cable trajectory CL3. In the vicinity of the right cable boundary BR multiple right cable trajectories are defined over the right guide wall 48 and the bottom wall 36, for example a first right cable trajectory CR1, a second right cable trajectory CR2 and a third right cable trajectory CR3. These cable trajectories all have a curvature with a constant radius or series of sections having radii that larger all than the are prescribed minimal bending radius of the underwater cable 100. The cable chute 35 is thereby configured to guide the underwater cable 100 around the stern 23 and to keep it spaced apart therefrom while it keeps fluent curvatures with radii above the prescribed minimal bending radius of the underwater cable 100.

The cable chute 35 comprises a left inner guide wall 54 and a right inner guide wall 55 that are welded to the bottom wall 36 under an angle of 90-100 degrees and that extend as from the top edge 37 to the bottom wall apex 41. The left inner guide wall 54 and the right inner guide wall 55 are thereby along the bottom wall 36 shorter than the left outer guide wall 42 and the right outer guide wall 48, and converge towards each other symmetrically with respect to the vertical symmetry plane S of the hull 21 as from the top edge 37 in the downward direction towards the bottom wall apex 41. The left inner guide wall 54 and the right inner guide wall 55 both have a height with respect to the bottom wall 36 that is smaller than the height of the left outer guide wall 42 and right outer guide wall 48 in the same direction.

As best shown in FIG. 3, the cable quadrant 60 is made of steel and comprises a straight base tube 61, a curved bottom guide tube 63 with a practically constant radius that is connected to the base tube 61, multiple interconnected brace tubes 64 that are connected with the base tube 61 and the bottom guide tube 63, and two curved upper guide tubes 66 that are connected with the bottom guide tube 63 by means of multiple struts that are not shown. The cable quadrant 60 comprises multiple guide rollers 65 between the bottom guide tube 63 and the upper guide tubes 66 that are in a V-configuration to form a cable guiding track 67 that extends over practically half a circle or 180 degrees. The two upper guide tubes 66 have a central section 69 with a constant spacing, and two outer sections 70 with increasing spacing as from the central section 69, whereby the cable guiding track 67 flares at its ends in a symmetrical manner. The cable guiding track 67 defines a cable boundary BQ that is fluently curved and that extends over half a circle or 180 degrees with a constant radius that is larger than the prescribed minimal bending radius of the underwater cable 100. The cable guiding track 67 defines multiple left cable trajectories, for example a first left cable trajectory QL1, a second left cable trajectory QL2 and a third left cable trajectory QL3, and multiple right cable trajectories, for example a first right cable trajectory QR1, a second right cable trajectory QR2 and a third right cable trajectory QR3 all having curvatures with a constant radius or with sections having radii that are all larger than the prescribed minimal bending radius of the underwater cable 100. The cable trajectories QL1, QL2, QL3, QR1, QR2, QR3 all continue along the central sections 69 in a notional straight middle plane while at the ends they may fluently bend out of that notional straight plane. The cable quadrant 60 comprises multiple feet 61 to stand on, and a hoisting brace 71 that extends spaced apart from and above the cable guiding track 67. The cable quadrant 60 has a largest exit width R between the ends of the cable guiding track 67 that is slightly smaller than the entrance opening width P of the cable chute 35, whereby it can slide through the cable chute 35 as from the deck 24.

Figure 4:
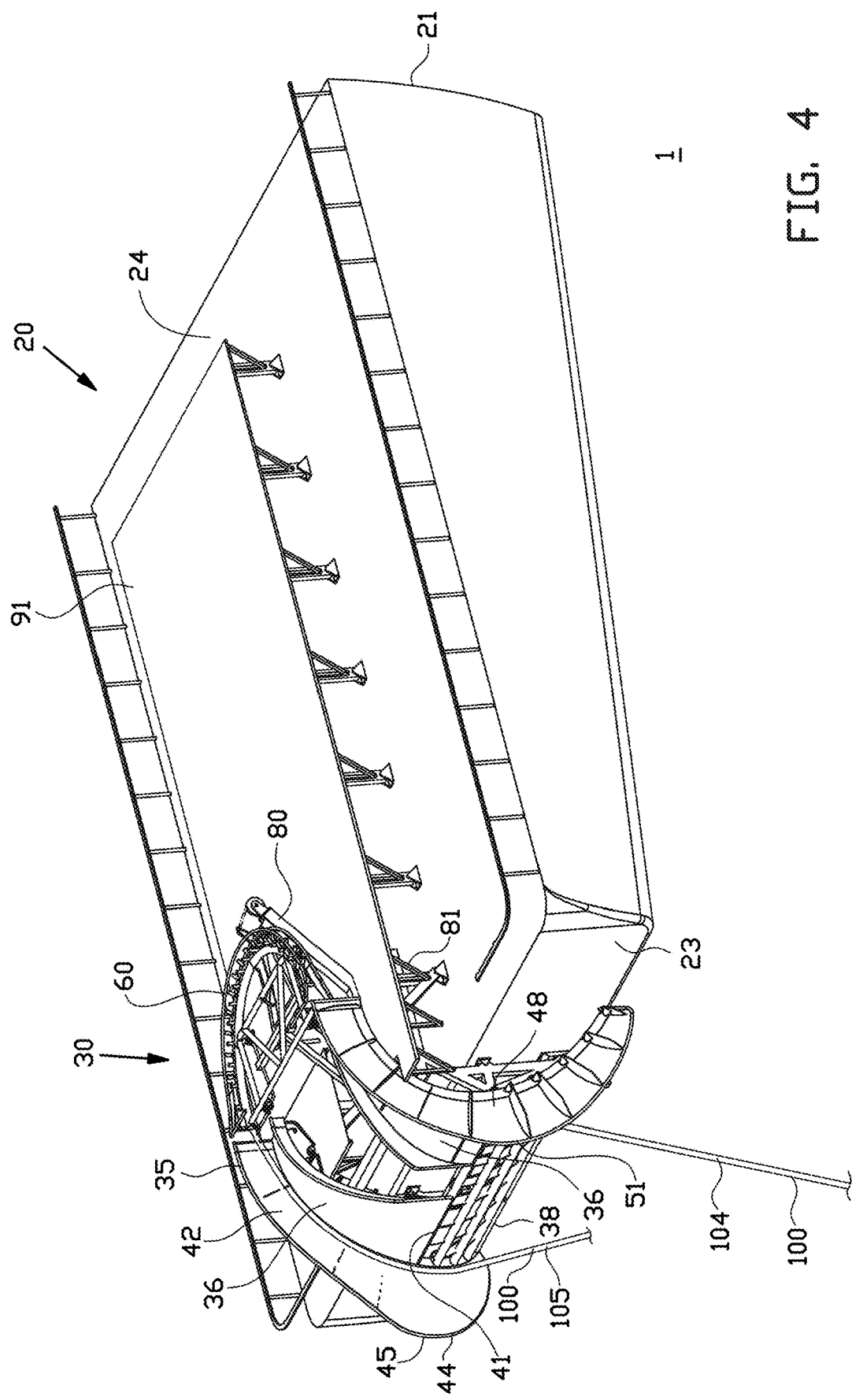
FIGS. 4, 5 and 6 are isometric views of the cable laying vessel of FIGS. 1A-1E at subsequent steps of an overboarding operation of the underwater cable.
Figure 5:
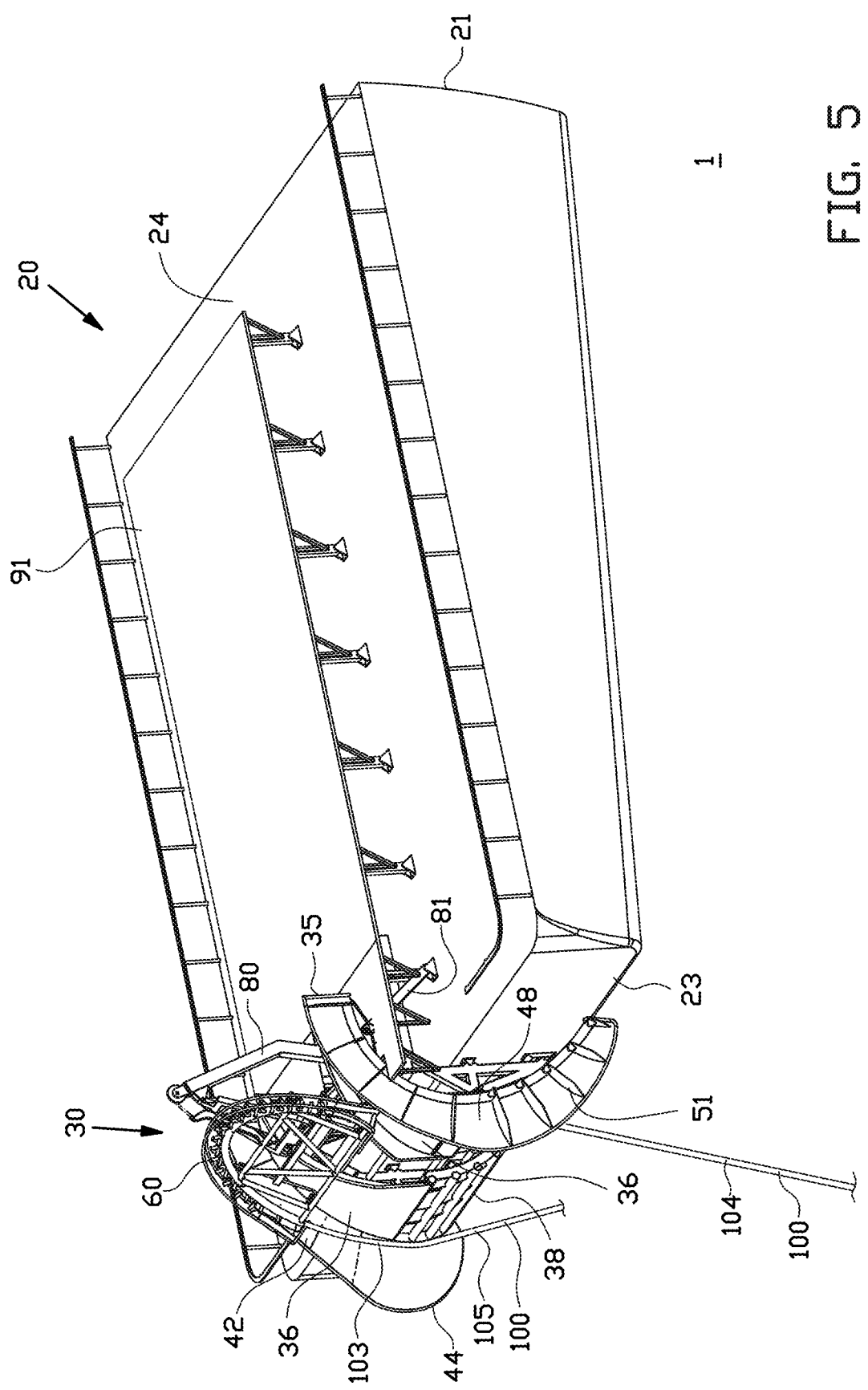
Figure 6:
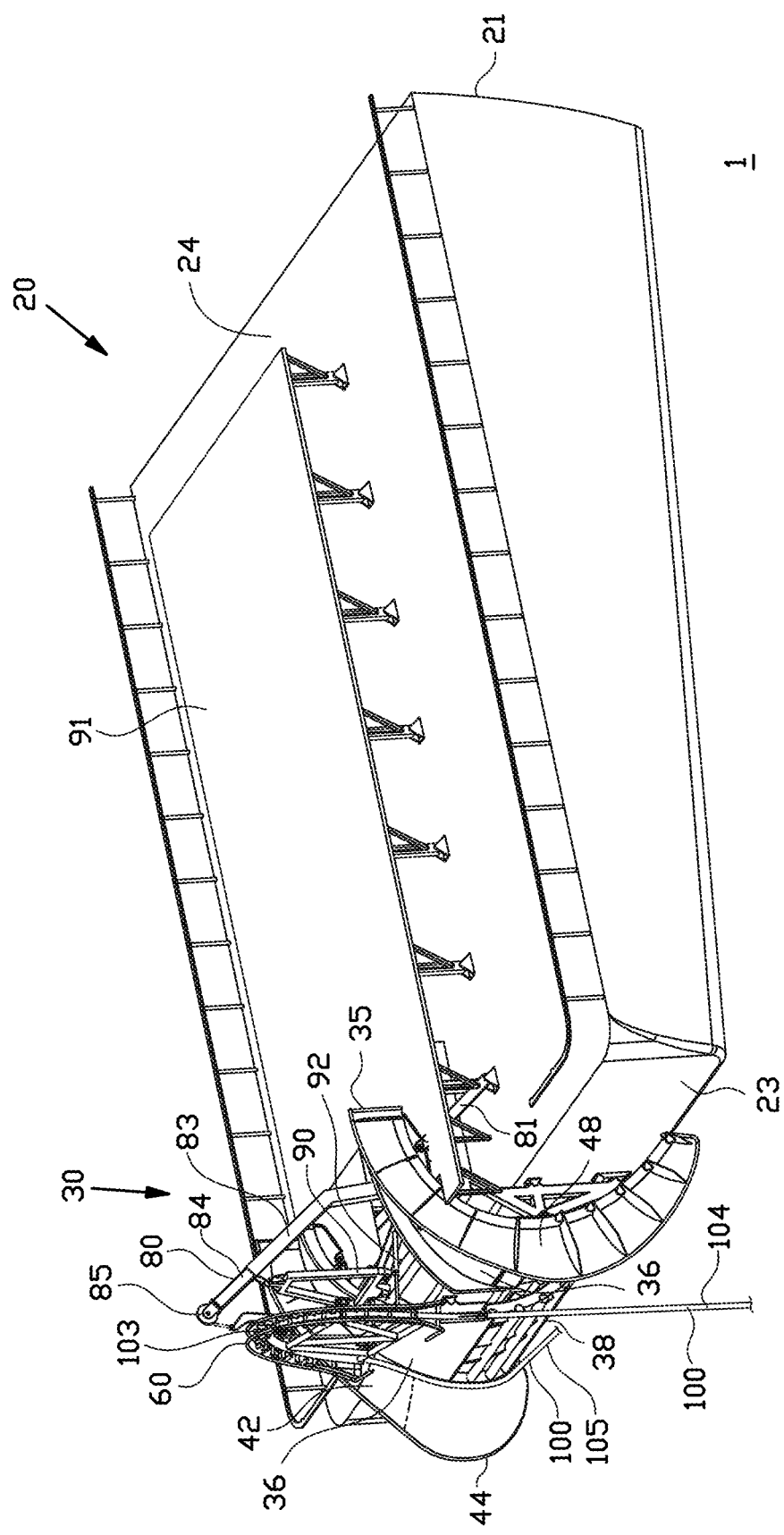
Figure 7A:
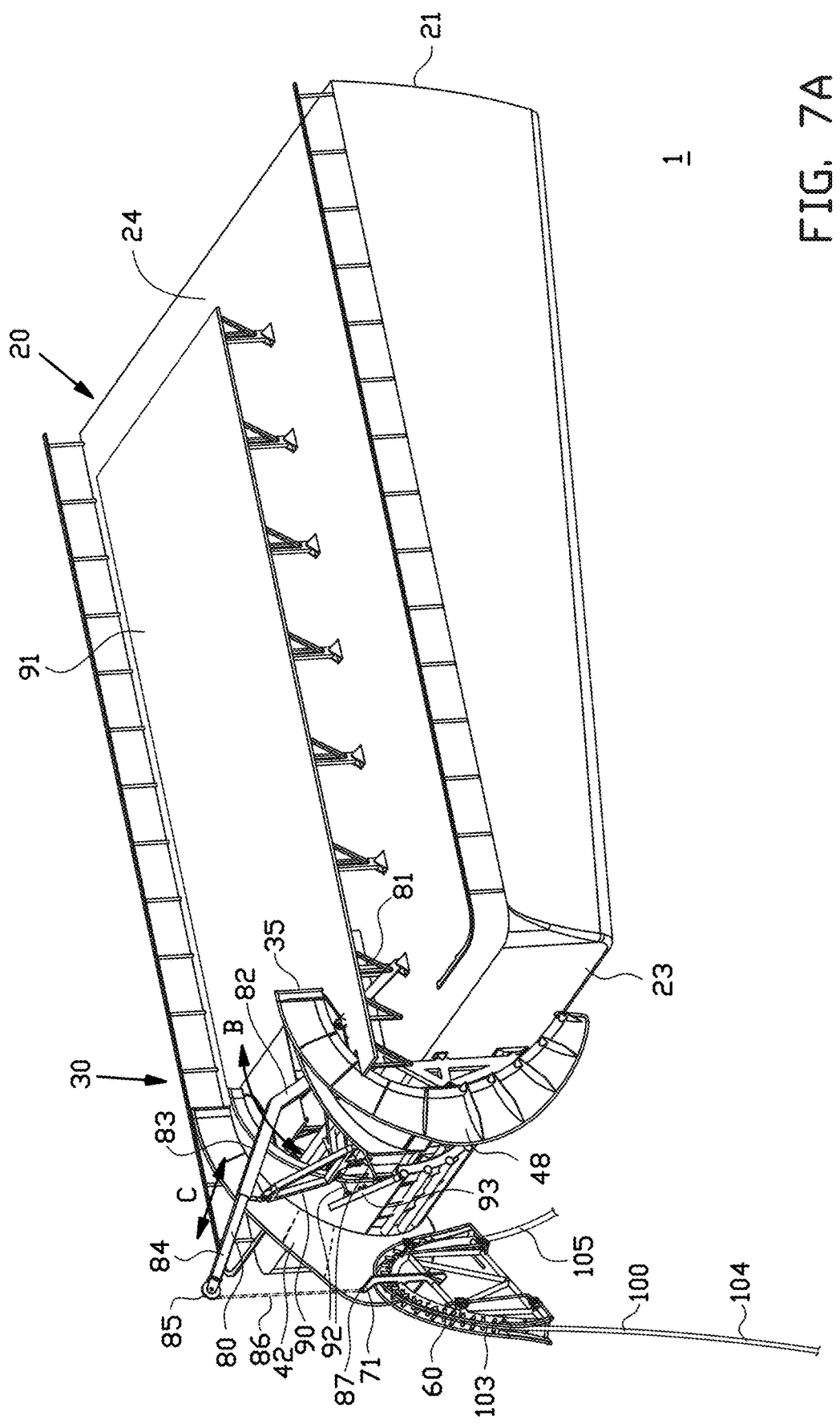
FIGS. 7A and 7B are an isometric view and a top view of the cable laying vessel of FIGS. 1A-1E at a final stage of the overboarding operation in which the underwater cable descends to the bottom of the water body.
Figure 7B:
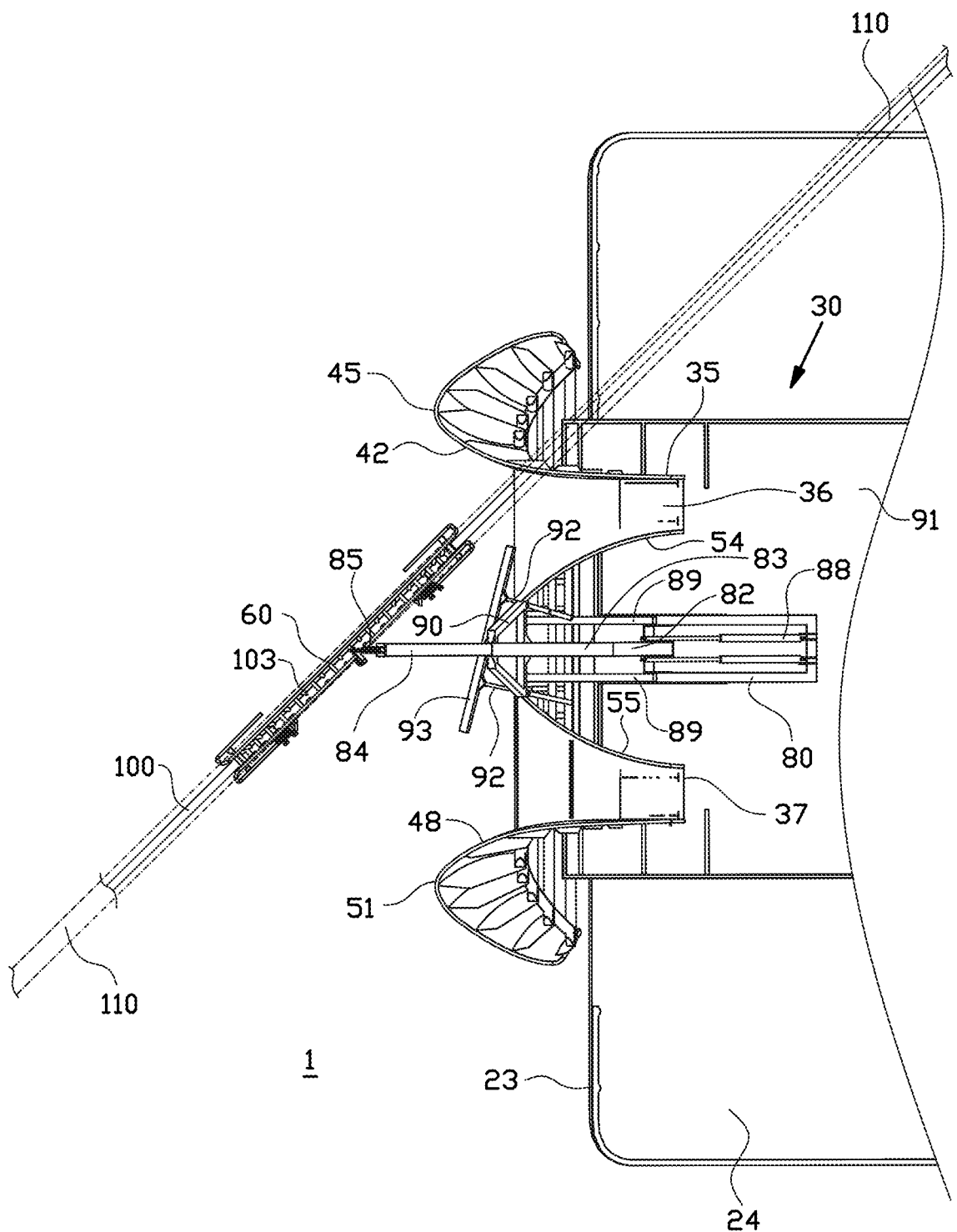

As best shown in FIGS. 1A, 7A and 7B, the quadrant manipulator 80 is made of steel and comprises a base frame 81 on the deck 24, a and a crane 82 having a first boom section 83 that is at one end pivotably connected with the base frame 81 to swing in a direction B around an axis parallel with the deck 24 by means of hydraulic cylinders 88 between a retracted position as shown in FIGS. 1A and 4, and an upright position as shown for example in FIG. 6. The crane 82 has a second boom section 84 that is telescopically guided inside the first boom section 83 to slide in direction C by means of a not shown internal hydraulic cylinder between a retracted position as shown in FIG. 5 and an extended position as shown in FIGS. 7A and 7B. The crane 82 has a hoisting sheeve 85 at the end of the second boom section 84, and a hoisting cable 86 with a hook 87 that can be hooked onto the end of the hoisting brace 71 and that is fed along the hoisting sheeve 85 to a not shown hydraulically powered hoisting winch.

The quadrant manipulator 80 comprises a support frame 90 that is at one side hingably connected with the first boom section 83, and that is at the opposite side hingeably connected with two parallel swivel bars 89 that are hingeably connected with the base frame 81 to form a tilting mechanism between the base frame 81 and the support frame 90. Due to this tilting mechanism the support frame 90 follows the swing of the first boom section 83 in direction B while it remains spaced apart therefrom. The quadrant manipulator 80 comprises in this example two parallel hydraulic support cylinders 92 that are at the cylinder side connected with the support frame 90, and that connected with an elongate cable are at the rod side quadrant support 93 to form a cable quadrant support drive. By powering the hydraulic support cylinders 92, the cable quadrant support 93 can move between a retracted position in which it extends parallel with and close to the bottom wall 36 of the cable chute 35 as shown in FIG. 5, and different extended positions further spaced apart from the bottom wall 36, wherein the cable quadrant support 93 extends parallel with the bottom wall 36 as shown in FIG. 5, or obliquely thereto as shown in FIG. 6, and in FIGS. 7A and 7B for example.

The cable quadrant guide 91 is supported by the base frame 81 and extends parallel with the deck 24. The cable quadrant guide 91 is configured to support the cable quadrant 60 and allows the cable quadrant 60 to linearly slide towards and away from the cable chute 35.

The cable laying operation starts in this example at the offshore wind turbine 10. The underwater cable 100 is supplied from a not shown cable storage carrousel on the deck 24 and is guided through the cable chute 35. The cable laying vessel 20 is maneuvered in the vicinity of the offshore wind turbine 10, and a first end 101 of the underwater cable 100 is paid out from the cable laying vessel 20 and connected with the offshore wind turbine 10 as shown in FIG. 1E. Subsequently the cable laying vessel 20 ships towards the offshore substation 11 while the trailing underwater cable 100 is fed from the storage carrousel. The cable laying vessel 20 is maneuvered according to a shipping route such that the released underwater cable 100 sinks and settles on the water body bottom 2 according to the prescribed cable route 110 while the bending radius remains above the prescribed minimal bending radius.

At the end of the shipping route, the cable laying vessel 20 is maneuvered on a cable overboarding location in the vicinity of the offshore substation 11 as shown in FIG. 1E. The underwater cable 100 is cut off from the remainder in the cable storage carrousel whereby on the deck 24 a second end 102 of the underwater cable 100 is obtained. The underwater cable 100 has a cable length between its first end 101 and its second end 102 that corresponds with the final inter-array situation between the connections inside the offshore wind turbine 10 and the offshore substation 11. On the deck 24 a cable overlength 103 of the underwater cable 100 is laid out on the cable quadrant guide 91 around the cable quadrant 60, wherein the underwater cable 100 extends through the cable guiding track 67 of the cable quadrant 60 according to the first left cable trajectory QL1 and the first right cable trajectory QR1. As from the cable quadrant 60, the cable overlength 103 has a first leg 104 towards the first end 101 and a second leg 105 towards the second end 102. The second end 102 is coupled to a pulling cable 120 that can be hauled in from the offshore substation 11. The first leg 104 passes through the cable chute 35 and follows the first right cable trajectory CR1, and the second leg passes through the cable chute 35 and follows the first left cable trajectory CL1.

On the cable overboarding, the cable laying vessel 20 is maneuvered in an ideal cable overboarding position with respect to the prescribed cable route 110. In the ideal cable overboarding position, the forward shipping direction L of the hull 21 is parallel to the local normal N to the tangent of the prescribed cable route 110. In this ideal cable overboarding position the second end 102 is hauled in from the offshore substation 11 while the cable overlength 103 on the cable quadrant guide 91 is released via the cable chute 35. During the release of the cable overlength 103, the cable quadrant 60 slides in linear direction F over the cable quadrant guide 91 and passes through the cable chute 35 while being controlled by means of a not shown winch. The cable quadrant 60 is lowered until it tips over on the water body bottom 2 to release the underwater cable 100 exactly on the prescribed cable route 110. Thereafter the second end 102 is connected inside the offshore substation 11.

Traditionally, with a traditional cable chute and a traditional cable quadrant, the entire cable laying operation could only be initiated when it was safe to maneuver the cable laying vessel 20 at the final stage on the cable overboarding location in the above described ideal cable overboarding position with respect to the prescribed cable route 110. In practice this was possible only when the local wave height is below a prescribed first safety height when the wave direction is parallel to the forward shipping direction L of the hull 21, or below a prescribed lower second safety height when the wave direction deviates from the forward shipping direction L of the hull 21. Otherwise the waves would induce rolling motions to the cable laying vessel 20 that would damage the underwater cable 100 during the overboaring of the cable overlength 103. Therefore in the traditional cable laying operation the local wave height during the overboaring of the cable overlength 103 was the limiting factor for the entire cable laying operation.

FIG. 1E schematically shows an operational situation in which on the cable overboarding location the local wave direction W is under an angle with respect to the local normal N of the tangent of the prescribed cable route 110. The cable laying vessel 20 according to the invention is maneuvered in a cable overboarding position with respect to the prescribed cable route 110 in which according to the invention the forward shipping direction L of the hull 21 is under an overboarding angle α with respect to the local normal N of the tangent of the prescribed cable route 110. The overboarding angle α is at least 10 degrees, preferably at least 20 degrees. Under this overboarding angle x, the cable overlength 103 is released via the cable chute 35, wherein the cable quadrant 60 slides in linear direction F over the cable quadrant guide 91 towards the cable chute 35 while being controlled by means of the not shown winch.

During the overboarding of the cable overlength 103 according to the invention, the cable quadrant 60 linearly guides the cable overlength 103 in the direction F over the cable quadrant guide 91, and the underwater cable 100 extends at the side of the cable chute 35 where it has the sharpest angle with respect to the prescribed cable route 110, in this example at the left outer guide wall 42, according to the first left cable trajectory CL1 through the cable chute 35 as from the cable quadrant guide 91 to below the stern 23. At the other side of the cable chute 35 where the angle with the prescribed cable route 110 is larger, in this example at the right outer guide wall 48, it becomes less critical. At this side the underwater cable 100 may initially follow the first right cable trajectory CR1 through the cable chute 35 at the side of the deck 24 and deviate therefrom thereafter under a larger bending radius.

The quadrant manipulator 80 is standby to receive the cable quadrant 60 in its retracted position. In the retracted position of the quadrant manipulator 80 the first boom section 83 is swung downwards in direction B in its retracted position, the second boom section 84 is retracted with respect to the first boom section 83, and the cable quadrant support 93 is in its retracted position as shown in FIG. 4. At the end of the linear movement of the cable quadrant 60 in the direction F, the cable quadrant 60 is enclosed between the outer guide walls 42, 48 of the cable chute 35 supported by the retracted cable quadrant support 93. When the hoisting cable 86 of the quadrant manipulator 80 is hooked onto the end of the hoisting brace 71 of the cable quadrant 60, the first boom section 83 is swung upwards in direction B as shown in FIG. 5, and the second boom section 84 is brought in a partial extended position in direction C, whereby the cable quadrant 60 is brought from its laying position into an upright position. The upright cable quadrant support 93 is brought in an obliquely extended position as shown in FIG. 6 by further extending the second boom section 84 and by extending the cable quadrant support 93 under a supporting angle with respect to the support frame 90 that practically corresponds with the overboarding angle x. The cable quadrant 60 thereby disengages the cable overlength of the underwater cable 100 from the right outer guide wall 48 and brings it in a vertical projection practically parallel with the prescribed cable route 110. As shown in FIGS. 7A and 7B, the second boom section 84 may be extended in direction C to its outermost position to release the entire underwater cable 100 from the cable chute 35, and the cable quadrant 60 is lowered by the hoisting cable 86 until it tips over on the water body bottom 2 to release the underwater cable 100 exactly on the prescribed cable route 110.

The cable handling installation 30 of the cable laying vessel 20 according to the invention comprises the cable chute 35 that extends as from the bottom wall apex 41 further downwards to under the hull 21 to form the flaring left trajectories CL1, CL2, CL3 and right trajectories CR1, CR2, CR3 all having a radius that is larger than the prescribed minimal bending radius of the underwater cable 100. The cable handling installation 30 comprises the quadrant manipulator 80 that can bring the cable quadrant 60 upright and under an angle with respect to the cable chute 35 while it is ensured by the cable chute 35 that the curvature in the underwater cable 100 remains above the prescribed minimal bending radius. The notional straight middle plane of the cable boundary BQ of the cable quadrant 60 extends parallel with the normal to the tangent of the prescribed cable route 110 at the overboarding location. The cable quadrant 60 is brought under this angle before the cable overlength 103 is lowered towards the water body bottom 2. Due to these measures it is possible to perform the cable laying operation under less favorable wave conditions than known in the art.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A cable laying vessel for laying an underwater cable, wherein the underwater cable has a prescribed minimal bending radius above which the structural integrity of the underwater cable is ensured,
   the cable laying vessel comprising a floating hull with a bow, a stern and a deck, and
   wherein the hull has a forward shipping direction,
   wherein the cable laying vessel further comprises a cable handling installation that comprises a cable chute at the stern, and a cable quadrant and a quadrant manipulator for the cable quadrant on the deck,
   wherein the cable chute comprises a convex curved bottom wall with a bottom wall apex where the bottom wall faces furthest away from the stern,
   wherein the bottom wall continues as from the bottom wall apex downwards back towards the stern, and
   wherein the cable chute comprises a left outer guide wall and a right outer guide wall that extend under an angle with the bottom wall and that flare away from each other in a downward direction,
   wherein a cable overlength of the underwater cable is fed along the cable quadrant and forms a first cable leg and a second cable leg that both extend as from the cable quadrant through the cable chute,
   wherein the left outer guide wall, the bottom wall and the right outer guide wall define multiple cable trajectories for the abutting first cable leg and the abutting second cable leg,
   wherein the cable trajectories are fluently curved and have over the entire length a radius or a series of sections with radii that are larger than the prescribed minimal bending radius of the underwater cable.

2. The cable laying vessel according to claim 1, wherein the bottom wall has a distal bottom end that extends in downward direction below the stern.

3. The cable laying vessel according to claim 1, wherein the bottom wall has a distal bottom end, wherein the tangent of the bottom wall at the distal bottom end extends in downward direction outside the stern.

4. The cable laying vessel according to claim 1, wherein the left outer guide wall and the right outer guide wall extend in a downward direction beyond the bottom wall apex along the bottom wall.

5. The cable laying vessel according to claim 4, wherein the bottom wall, the left outer guide wall and the right outer guide wall of the cable chute define an entrance opening of the cable chute having an entrance opening width, and an exit opening of the cable chute having an exit opening width,
wherein the cable trajectories extend between the entrance opening and the exit opening,
wherein the exit opening width is at least 1.5 times the entrance opening width.

6. The cable laying vessel according to claim 1, wherein the bottom wall, the left outer guide wall and the right outer guide wall of the cable chute define an entrance opening of the cable chute having an entrance opening width, and an exit opening of the cable chute having an exit opening width,
wherein the cable trajectories extend between the entrance opening and the exit opening,
wherein the entrance opening width is larger than the width of the cable quadrant.

7. The cable laying vessel according to claim 1, wherein the bottom wall, the left outer guide wall and/or the right outer guide wall are formed with a plate, with consecutive plate sections, with parallel tubes or combinations thereof.

8. The cable laying vessel according to claim 1, wherein the cable quadrant comprises a cable guiding track that extends over half a circle,
wherein the cable guiding track has a central section and two end sections at the ends of the central section that flare as from the central section,
wherein the cable guiding track defines multiple cable trajectories that are fluently curved and that have over the entire length a radius or a series of sections with radii that are all larger than the prescribed minimal bending radius of the underwater cable,
wherein the cable trajectories extend along the central section of the cable guiding track in a notional straight middle plane and may bend out of that notional straight middle plane along the end sections.

9. The cable laying vessel according to claim 8, wherein the end sections of the cable guiding track flare away symmetrically with respect to the notional straight plane, and the cable trajectories may bend out to both sides of the notional straight middle plane.

10. The cable laying vessel according to claim 1, wherein the quadrant manipulator comprises a base frame, a support frame, a tilting mechanism between the base frame and the support frame, and a cable quadrant support that is configured to receive and support the cable quadrant,
wherein the support frame is tiltable between a retracted position to receive the cable quadrant, and an extended position in which the cable quadrant extends in an upright position with respect to the cable chute.

11. The cable laying vessel according to claim 10, wherein the quadrant manipulator comprises a cable quadrant support drive between the support frame and the cable quadrant support,
wherein the cable quadrant support drive is configured to move the cable quadrant support with respect to the support frame between a retracted position to receive the cable quadrant, and multiple extended positions in which the cable quadrant support extends further away from the support frame and under a supporting angle with respect to the retracted position.

12. The cable laying vessel according to claim 10, wherein the quadrant manipulator comprises a crane for hoisting the cable quadrant in the upright position.

13. The cable laying vessel according to claim 10, wherein the crane comprises a crane boom that is pivotably connected with the base frame,
wherein the crane boom is pivotable between a retracted position to receive the cable quadrant, and an upright position in which the cable quadrant hangs on the crane boom.

14. The cable laying vessel according to claim 10, wherein the crane comprises a hoisting cable that extends between the crane boom and the cable quadrant.

15. A method for laying an underwater cable according to a prescribed cable route on a water body bottom between two offshore installations by means of a cable laying vessel,
wherein the underwater cable has a prescribed minimal bending radius above which the structural integrity of the underwater cable is ensured, and
wherein the cable laying vessel comprises a floating hull with a bow, a stern and a deck, and
wherein the hull has a forward shipping direction,
wherein the cable laying vessel comprises a cable handling installation that comprises a cable chute at the stern, and a cable quadrant and a quadrant manipulator for the cable quadrant on the deck,
wherein the cable chute comprises a convex curved bottom wall with a bottom wall apex where the bottom wall faces furthest away from the stern,
wherein the bottom wall continues as from the bottom wall apex downwards back towards the stern, and
wherein the cable chute comprises a left outer guide wall and a right outer guide wall that extend under an angle with the bottom wall and that flare away from each other in a downward direction,
wherein a cable overlength of the underwater cable is fed along the cable quadrant and forms a first cable leg and a second cable leg that both extend as from the cable quadrant through the cable chute,
wherein the left outer guide wall, the bottom wall and the right outer guide wall define multiple cable trajectories for the abutting first cable leg and the abutting second cable leg,
wherein the cable trajectories are fluently curved and have over the entire length a radius or a series of sections with radii that are larger than the prescribed minimal bending radius of the underwater cable,
wherein the method comprises at the first offshore installation releasing a first end of the underwater cable from the deck via the cable chute and bringing the first end to the first offshore installation, maneuvering the cable laying vessel along the prescribed cable route while releasing the underwater cable from the deck via the cable chute wherein the underwater cable settles on the water body bottom on the prescribed cable route, maneuvering the cable laying vessel to a cable overboarding location between the first offshore installation and the second offshore installation, wherein the cable laying vessel is maneuvered with the hull under an overboarding angle with the normal to the tangent of the prescribed cable route at the cable overboarding location,
wherein the overboarding angle is larger than 10 degrees,
wherein the first leg or the second leg extends behind the cable chute in a vertical projection under the hull.

16. The method according to claim 15, wherein the overboarding angle is larger than 20 degrees.

17. The method according to claim 15, wherein the quadrant manipulator comprises a base frame, a support frame, a tilting mechanism between the base frame and the support frame, and a cable quadrant support that is configured to receive and support the cable quadrant,
- wherein the support frame is tiltable between a retracted position to receive the cable quadrant, and an extended position in which the cable quadrant extends in an upright position with respect to the cable chute,
- wherein the method comprises receiving the cable quadrant by the cable quadrant support with the support frame in the retracted position, and tilting the support frame into the extended position to bring the cable quadrant from a lying position wherein the cable quadrant extends parallel to the deck, into the upright position with respect to the cable chute.

18. The method according to claim 15, wherein the quadrant manipulator comprises a cable quadrant support drive between the support frame and the cable quadrant support,
- wherein the cable quadrant support drive is configured to move the cable quadrant support with respect to the support frame between a retracted position to receive the cable quadrant, and multiple extended positions in which the cable quadrant support extends further away from the support frame and under an angle with respect to the retracted position,
- wherein the method comprises bringing the cable quadrant under a supporting angle by means of the cable quadrant support,
- wherein the supporting angle is equal to the overboarding angle.

19. The method according to claim 15, wherein the quadrant manipulator comprises a crane for hoisting the cable quadrant in the upright position,
- wherein the method comprises hoisting the cable quadrant in its upright position by means of the crane, and lowering the cable overlength of the underwater cable as from the cable chute towards the prescribed cable route by means of the hoisted cable quadrant.

* * * * *